United States Patent
Smith

(10) Patent No.: US 7,805,914 B2
(45) Date of Patent: Oct. 5, 2010

(54) HYDRAULIC BALE KICKER WITH OPTIONAL WEIGHING DEVICE

(75) Inventor: Kevin M. Smith, Narvon, PA (US)

(73) Assignee: CNH America LLC, New Holland, PA (US)

( * ) Notice: Subject to any disclaimer, the term of this patent is extended or adjusted under 35 U.S.C. 154(b) by 280 days.

(21) Appl. No.: 12/045,631

(22) Filed: Mar. 10, 2008

(65) Prior Publication Data
US 2009/0223196 A1    Sep. 10, 2009

(51) Int. Cl.
*A01D 90/10* (2006.01)
*A01D 69/03* (2006.01)
*G01G 19/10* (2006.01)

(52) U.S. Cl. .................. 56/10.7; 56/11.9; 56/341; 53/502; 100/88; 177/136

(58) Field of Classification Search .......... 53/502; 56/341, 10.7, 11.9; 100/88; 177/136
See application file for complete search history.

(56) References Cited

U.S. PATENT DOCUMENTS

| | | | |
|---|---|---|---|
| 3,567,072 A | 3/1971 | Tenhulzen | |
| 4,362,097 A | 12/1982 | Rogers | |
| 4,742,880 A | 5/1988 | Schrag et al. | |
| 4,770,093 A * | 9/1988 | Gunther et al. | 100/88 |
| 4,821,637 A * | 4/1989 | Viaud | 100/88 |
| 5,161,628 A * | 11/1992 | Wirth | 177/137 |
| 5,263,410 A | 11/1993 | Olin | |
| 5,384,436 A | 1/1995 | Pritchard | |
| 5,622,104 A | 4/1997 | Viesselmann et al. | |
| 5,717,167 A * | 2/1998 | Filing et al. | 177/136 |
| 5,811,739 A | 9/1998 | Palmore | |
| 5,959,257 A * | 9/1999 | Campbell et al. | 177/16 |
| 6,066,809 A * | 5/2000 | Campbell et al. | 177/16 |
| 6,248,963 B1 | 6/2001 | Gottlöber | |
| 6,378,276 B1 | 4/2002 | Dorge et al. | |
| 6,457,295 B1 | 10/2002 | Arnold | |
| 6,807,901 B2 * | 10/2004 | Bentzinger et al. | 100/87 |
| 6,892,632 B1 | 5/2005 | Viesselmann | |
| 7,064,282 B2 | 6/2006 | Viaud et al. | |
| 7,091,425 B2 | 8/2006 | Viaud et al. | |
| 7,197,979 B2 | 4/2007 | Derscheid | |
| 7,472,649 B1 * | 1/2009 | Derscheid et al. | 100/88 |
| 2005/0217233 A1 * | 10/2005 | Smith et al. | 56/341 |
| 2005/0257513 A1 | 11/2005 | Smith et al. | |
| 2009/0139195 A1 * | 6/2009 | Humbert | 56/10.7 |

FOREIGN PATENT DOCUMENTS

EP    1444882    12/2006

* cited by examiner

*Primary Examiner*—Randy W Gibson
(74) *Attorney, Agent, or Firm*—Patricia M. Sheldrake; John William Stader; Michael G. Harms

(57) ABSTRACT

A hydraulically actuated bale kicker apparatus for ejecting a completed bale rearwardly from a round baler without interfering with the opening and closing of the baler tailgate wherein actuators for the tailgate and bale kicker are hydraulically connected in a single, reversible flow hydraulic circuit for coordinated movement.

14 Claims, 4 Drawing Sheets

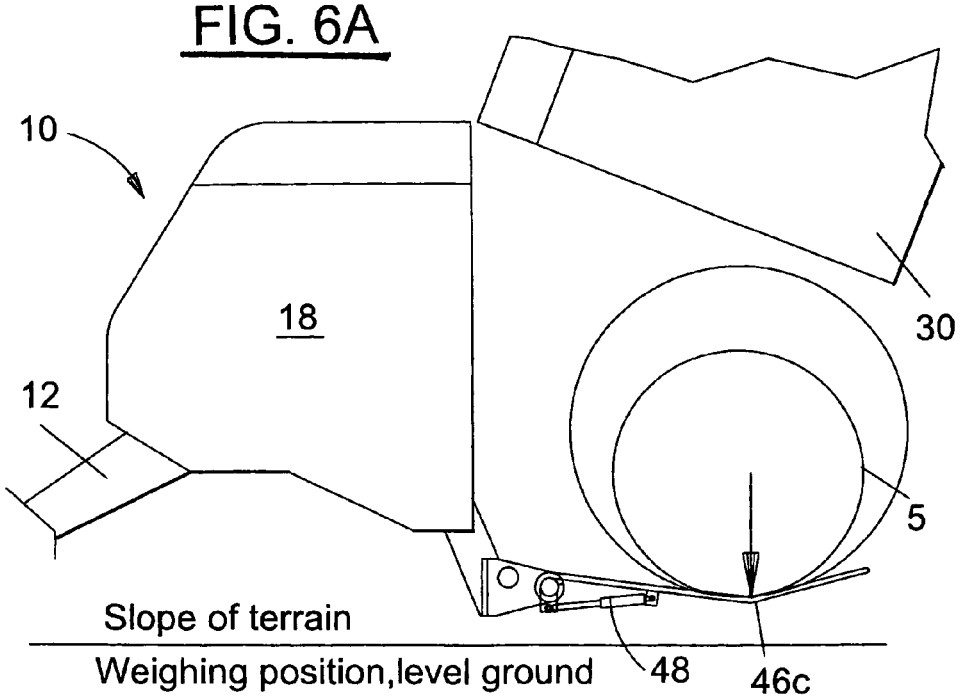

HYDRAULIC BALE KICKER WITH OPTIONAL WEIGHING DEVICE

BACKGROUND OF THE INVENTION

The present invention, relating generally to an agricultural baler for forming cylindrical bales of crop material, commonly referred to as a round baler, is specifically directed to an apparatus for ejecting the bale from the baler following bale formation to provide clearance for baler tailgate operation. More particularly, this invention is concerned with a bale kicker apparatus that allows the tailgate opening and closing cycle to occur as quickly as possible.

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler is pulled along the windrows to pick up the crop material and form it into conveniently sized and shaped round bales. More specifically, the windrow pickup of the baler gathers the cut and windrowed crop material and lifts it into the baling chamber. In a round baler, the baling chamber consists of a pair of opposing sidewalls with a series of belts that rotate and compress the crop material into a cylindrical shape. When the bale has achieved a desired size and density, the operator wraps the bale to ensure that the bale maintains its shape and density. The operator then raises the tailgate of the baler and the bale is ejected onto the ground, generally urged by a kicker apparatus. The tailgate is then closed and the cycle repeated as necessary and desired to manage the field of cut crop material. A representative example of a round baler of this type is the round baler of U.S. Pat. No. 4,458,587, by Richard E. Jennings, which is incorporated in its entirety herein by reference.

When ejecting a bale, it is important to insure that the bale has rolled clear of the open tailgate before closing the tailgate to resume baling. It is also important for the cycle time for opening and closing the tailgate to be as short as possible to minimize unproductive time in the field. Experience with mechanical spring kicker devices has shown that known examples do not provide sufficient force to move the bale away from the tailgate swing area as quickly as is desired. Experience with known hydraulically actuated kickers is a tendency to slow movement of the tailgate resulting in increased tailgate opening and closing cycle time.

It would be a great advantage to provide a bale kicker apparatus for a round baler capable of ejecting a finished bale from the baler in minimal time without interfering with the opening and closing cycle of the baler tailgate that overcomes the above-identified problems and disadvantages.

SUMMARY OF THE INVENTION

Accordingly, it is an object of the present invention to provide a hydraulically actuated bale kicker apparatus for a round baler that ejects the bale without interfering the opening and closing of the baler tailgate and avoids the above-noted disadvantages.

It is another object of the present invention to provide a hydraulically powered bale kicker for a round baler that ejects the bale to clear the tailgate without slowing opening or closing of the tailgate.

It is a further object of the present invention to provide a hydraulically actuated bale kicker for a round baler that hydraulically interconnects with the hydraulic system positioning the tailgate to coordinate movement of the kicker with respect to tailgate position.

It is a further object of the present invention to provide a hydraulically actuated bake kicker for a round baler that uses hydraulic pressure in a regulated actuator bleed circuit to actuate the bale kicker without requiring any additional hydraulic fluid flow from the hydraulic system.

It is a further object of the present invention to provide a hydraulically powered bale kicker for a round baler that optionally provides a measurement of bale weight.

It is a still further object of the present invention to provide a bale kicker apparatus featuring ramp design capable of accommodating bales of varying sizes.

It is a still further object of the present invention to provide a bale kicker apparatus with an optional bale weighing feature that compensates for variations in the slope of the terrain on which the baler is positioned.

It is a still further object of the present invention to provide bale ejecting apparatus for a round baler that is durable in construction, inexpensive of manufacture, carefree of maintenance, easily assembled, and simple and effective to use.

These and other objects are achieved by providing a hydraulically actuated bale kicker apparatus for a round baler for ejecting a completed bale rearwardly from the round baler without interfering with the opening and closing of the baler tailgate wherein actuators for the tailgate and bale kicker are hydraulically connected in a single, reversible flow hydraulic circuit for coordinated movement.

BRIEF DESCRIPTION OF THE DRAWINGS

The advantages of this invention will be apparent upon consideration of the following detailed disclosure of the invention, especially when taken in conjunction with the accompanying drawings wherein:

FIG. 6 is a pair of partial side views, FIG. 6A and FIG. 6B, of the bale kicker apparatus showing bale weighing on varying and uneven terrain.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
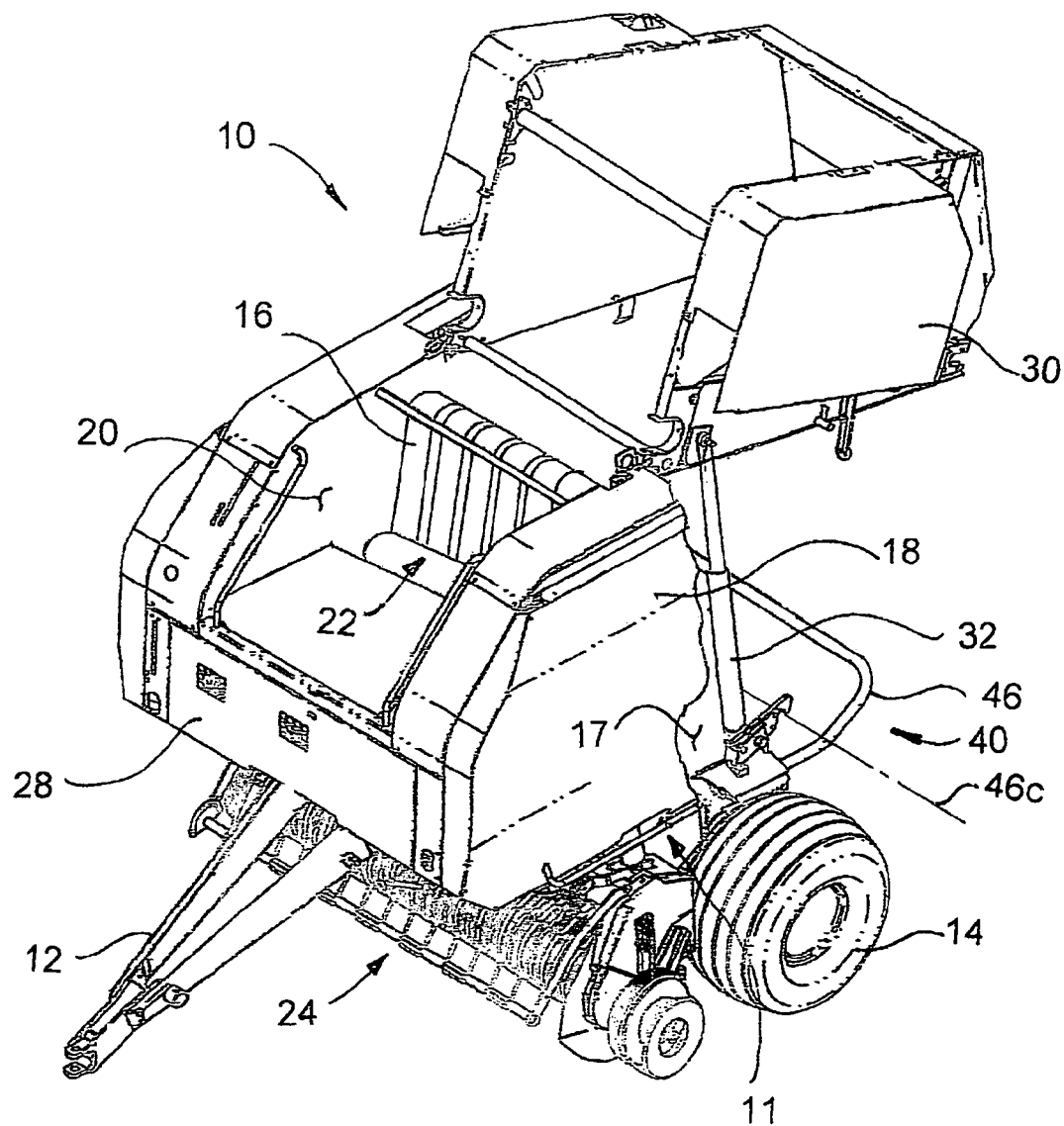
FIG. 1 is an isometric view of a typical round baler shown with a tailgate in the raised position and having a bale kicker apparatus of the type on which the present invention is useful.

Referring to FIG. 1, a generally well-known round baler 10 is shown to comprise a main frame 11 terminating forwardly in a tongue 12 and rearwardly slightly beyond a transverse axle to which a pair of wheels 14 (only one shown) are mounted, thus forming a ground supported main frame (not shown in detail) for forward movement across the ground. The main frame 11 supports a series of belts 16 and rolls (not shown) which together with a first sidewall 17 (shown in the breakout) behind and generally parallel to cover panel 18 and a second sidewall 20, all together establishing a bale-forming chamber 22. Cut crop material is picked up by transverse pickup 24 and fed into bale-forming chamber 22 where it is, as discussed above, formed into a cylindrically shaped bale. It is then wrapped with twine or a wrapping material dispensed from a wrapping mechanism generally behind shield 28. Upon completion of the wrapping process, tailgate 30 is pivoted upwardly by operation of tailgate actuator 32 (only one side shown), and the bale is ejected onto the ground. To expedite bale ejection, a bale kicker 40 is provided to urge the completed bale rearwardly to provide clearance for the tailgate 30 to be returned to a closed position and baling operations to resume. Tailgate actuator 32 is preferably a double-acting hydraulic cylinder, requiring pressurized hydraulic fluid to extend and open the tailgate and also to retract and close the tailgate 30.

Figure 2:
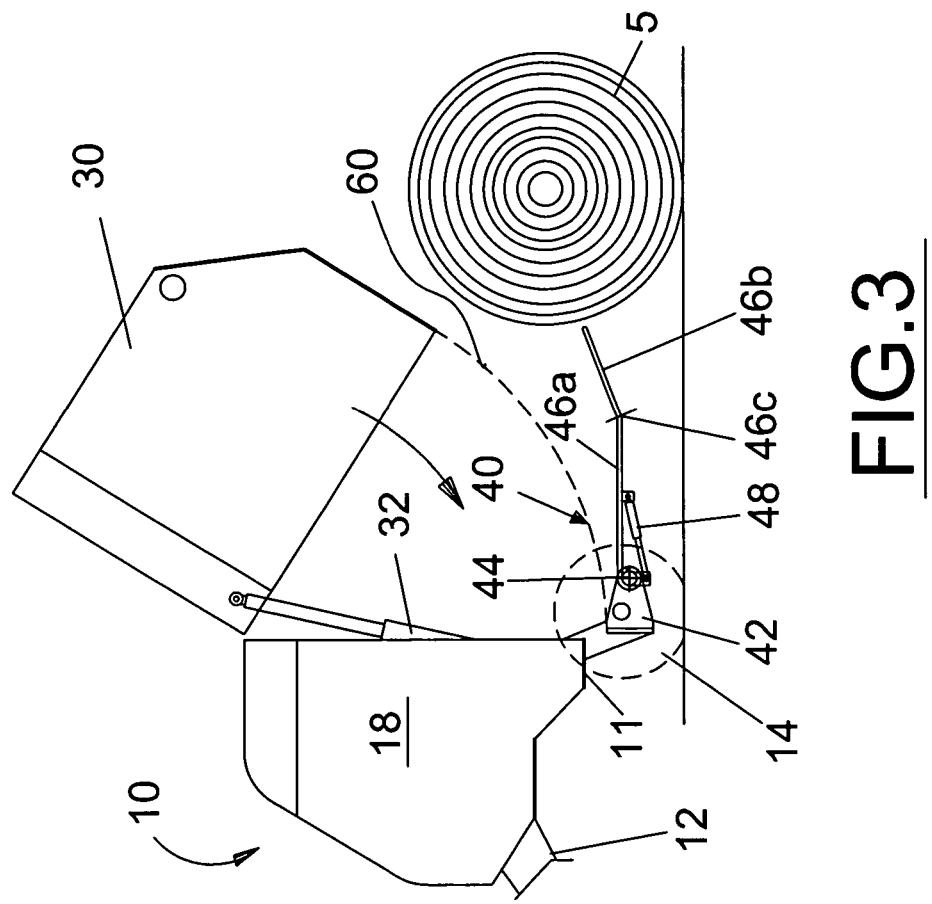
FIG. 2 is a partial side view of the round baler of FIG. 1 showing the tailgate in the open position and the bale kicker apparatus in the lowered position.

FIG. 2 shows a partial side elevation view of baler 10 also showing bale kicker 40 having a ramp 46, a chassis mount 42 with a pivot axis 44 about which the ramp 46 pivots. Pivot axis 44 is arranged generally parallel to the ground and transversely with respect to the forward-rearward direction of normal baler movement across the ground. The bale kicker ramp 46 typically comprises an open framework structure having sufficient frame members to support a bale as it is being ejected. Ramp 46 includes a forward portion 46a and a rearward portion 46b; the portions are angled relative to each other, forming an obtuse angle therebetween along bend axis 46c. Angling of the forward and rearward portions of the ramp 46 causes the bale to move toward the bend axis as it drops onto the ramp thereby providing a consistent position on the ramp from bale to bale. A consistent bale position on the ramp 46 is required for determining the weight of the bale, discussed in greater detail later herein. The pivotal position of ramp 46 is managed by ramp actuator 48 which interconnects chassis mount 42 and the ramp 46. Ramp actuator 48 is preferably a single-acting hydraulic cylinder hydraulically connected to a hydraulic control system, discussed later.

As presented in FIG. 2, a bale 5 has been completed and tailgate 30 moved into the raised position to allow the bale to be ejected. The bale 5 drops on to ramp 46 and moves toward a position generally centered over bend axis 46c. The weight of the bale 5 on the ramp 46 forces the ramp toward the lowered position as ramp actuator 48 is vented to allow hydraulic fluid to be freely returned to the hydraulic control system as the ramp moves downwardly. As the ramp continues its downward movement, the bale will at some point begin to roll rearwardly away from the baler.

Figure 3:
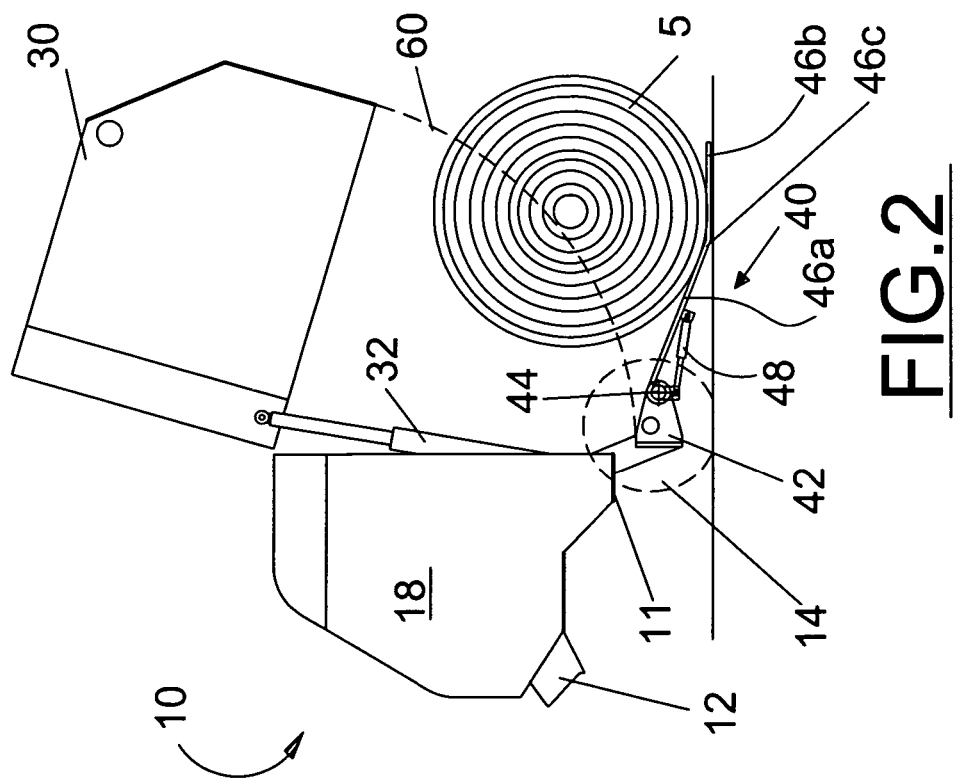
FIG. 3 is a partial side view of the round baler of FIG. 1 showing the tailgate in the open position and the bale kicker apparatus in the raised position.

Referring now to FIG. 3, the bale 5 is resting on the ground and the tailgate 30 closing has commenced. Tailgate actuator 32 is pressurized for retraction to close the tailgate 30. Ramp actuator 48 is hydraulically connected in parallel to the retraction side of tailgate actuator 32 and thus is also pressurized to move ramp 46 toward the raised position. As the ramp 46 moves upwardly, it contacts the bale and urges it further rearward to clear the space required for tailgate 30 to complete its downward swing, shown as arc 60, and return to the closed position.

Figure 4:
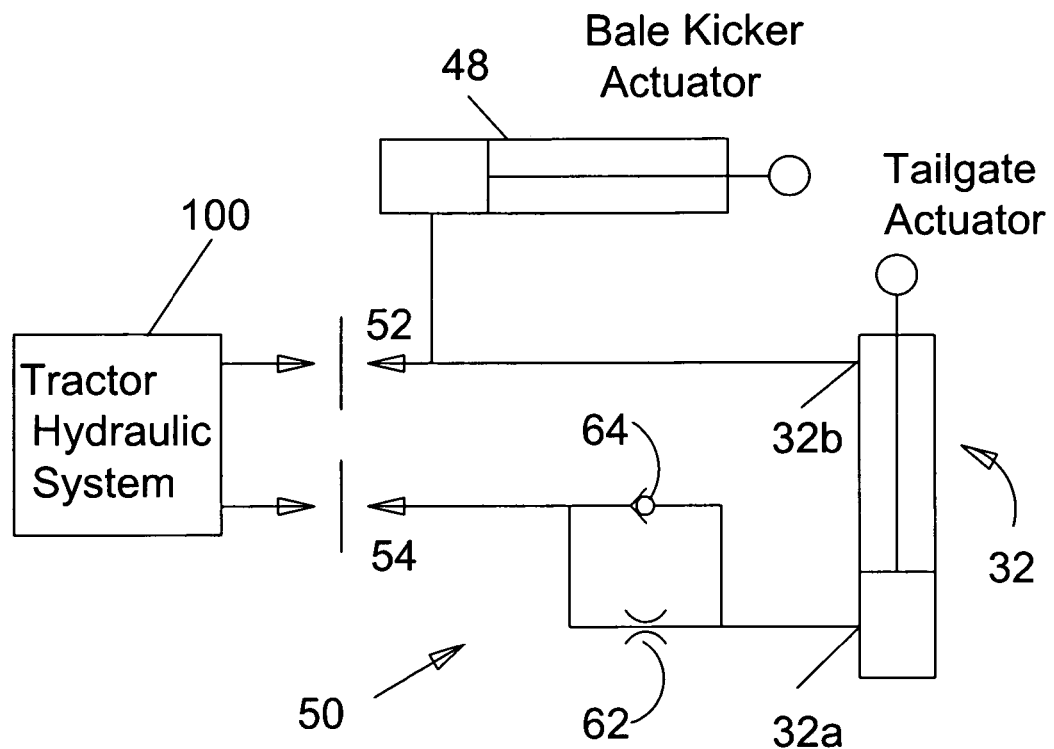
FIG. 4 is a schematic view of the hydraulic system of a first embodiment of the present invention.

FIG. 4 depicts a hydraulic control system 50 for managing the movement of the tailgate and bale kicker. Hydraulic control system 50 is a single loop hydraulic circuit receiving hydraulic fluid from a tractor hydraulic system 100, which allows selective pressurization to portions of the baler hydraulic control system 50 to cause desired tailgate directional movement. Tractor hydraulic system 100 is well known in the art and not discussed further in detail. Pressurizing the tailgate raise portion of the circuit, shown as connection 54 and providing a non-pressurized fluid return path through connection 52 supplies pressurized fluid to extension port 32a on the tailgate actuator 32 and causes is to extend and raise the tailgate. The retraction port 32b is vented allowing fluid to be returned to reservoir in the tractor hydraulic system 100. Ramp actuator 48 is also aligned to release fluid to the tractor hydraulic system 100 and allow the kicker ramp to move to the lowered position (positions shown in FIG. 2).

Reversing the supply and return lines to supply pressurized fluid to connection 52 and vent the return connection 54 to the tractor hydraulic reservoir supplies pressurized fluid to the ramp actuator 48 and the retraction side 32b of tailgate actuator 32. Orifice 62 disposed in the tailgate actuator hydraulic extension line restricts the flow of hydraulic fluid thereby controlling the rate of tailgate closure and prevent it from slamming closed. The orifice 62 is bypassed during the extension cycle by check valve 64 as the weight of the tailgate itself provides sufficient resistance to tailgate movement. The upward movement of the ramp urges the completed bale out of the way of the tailgate closure path (arc 60 in FIGS. 2 and 3) without impeding the rate of tailgate closure, which is controlled by the orifice 62. The additional fluid required to extend ramp actuator 48 has a negligible effect on the rate at which the tailgate actuator retracts.

Figure 5:
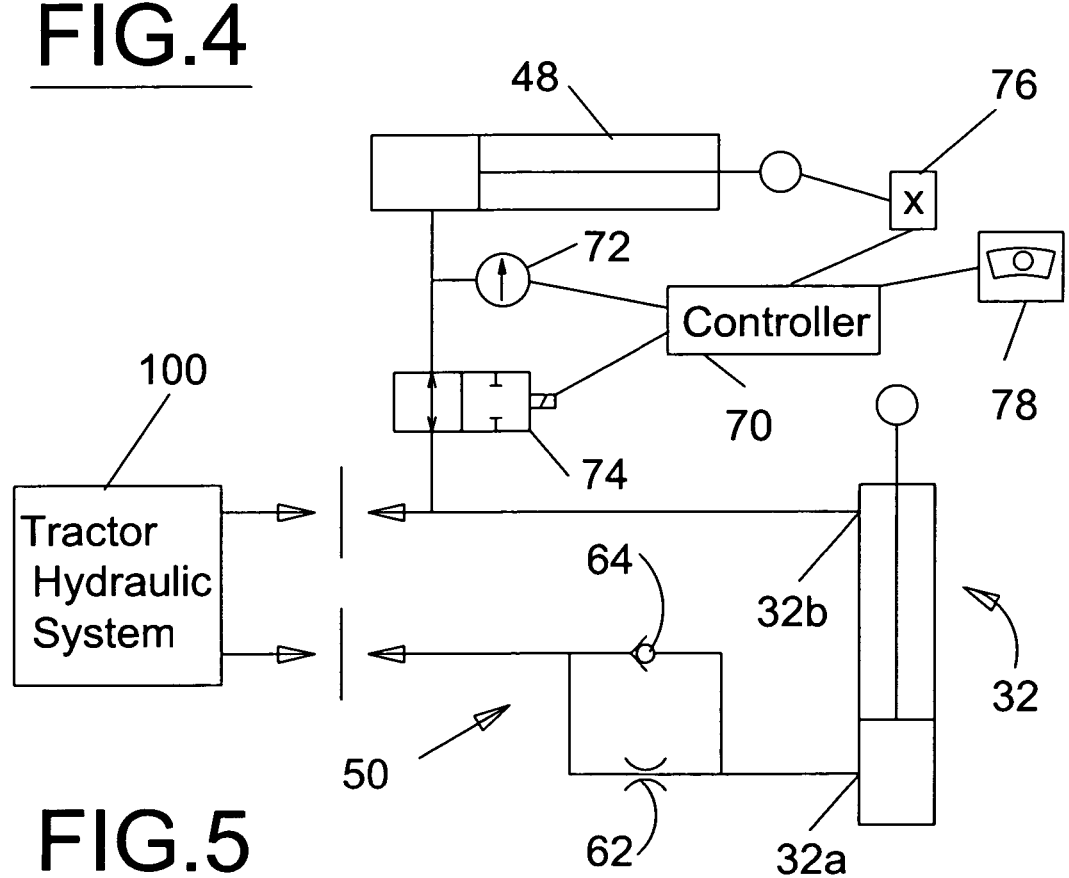
FIG. 5 is schematic view of the hydraulic system for a second embodiment of the present invention having bale weighing capability.

Referring now to FIGS. 5 and 6, FIG. 5 presents a second embodiment of the hydraulic control system 50 which includes provisions to determine the weight of bale before it is ejected from the baler. In this embodiment, pressure sensor 72 and valve 74 have been incorporated into the hydraulic line connecting ramp actuator 48 to the hydraulic control system 50. By closing valve 74 during the tailgate opening-ramp lower cycle, ramp movement can suspended to allow a pressure reading to be obtained. Pressure in ramp actuator 48 can be correlated to bale weight. The addition of a ramp position sensor 76, a baler level sensor 78, and a controller 70 allow the position of the ramp at the point at which bale weight is taken to be adjusted to account for variations in the terrain over which the baler is traversing as illustrated in FIG. 6B. Consistent bale weights require that the bale position on the ramp be the same each time bale weight is determined, illustrated by contrasting FIGS. 6A and 6B. Inputs from level sensor 78 and the position of the ramp as indicated by position sensor 76 are used to determine the optimal ramp position to assure the bale is properly positioned on the ramp, preferably at the bend axis between the angled forward and rearward portions of the ramp. Once that position is reached, valve 74 would temporarily isolate the hydraulic line so that a pressure signal from sensor 72 could be received. Normal bale ejection continues from that point when valve 74 is opened to allow the ramp to continue its downward movement.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A bale kicker apparatus for an agricultural round baler, the baler having a ground supported chassis for movement across the ground in a forward direction, and a movable tailgate, the apparatus comprising:
   a first actuator for moving the tailgate between an open position and a closed position;
   a movable bale ramp pivotally connected to the chassis for pivotal movement about an axis, said ramp having a forward portion and a rearward portion, said forward portion being angled with respect to said rearward portion;
   a second actuator for managing the pivotal position of said ramp between raised and lowered positions; and
   a hydraulic control system interconnecting said first actuator and said second actuator wherein movement of the tailgate toward the open position causes movement of said ramp toward said lowered position, and movement of the tailgate toward the closed position causes movement of said ramp toward said raised position and said first actuator is a double-acting hydraulic actuator having an extension side and a retraction side and said second actuator is a single acting hydraulic actuator, said retraction side and said second actuator are connected in a parallel flow arrangement to said hydraulic control system.

2. The apparatus of claim 1, wherein movement of said first actuator and said second actuator is managed by a single hydraulic circuit.

3. The apparatus of claim 2, further comprising a control valve disposed in the hydraulic connection between said second actuator and said hydraulic control system, a pressure sensor for providing a pressure signal representing hydraulic pressure in said second actuator, and a position sensor for providing a position signal representing the pivotal position of said ramp, wherein said control valve manages movement of said second actuator to interrupt movement of said ramp at a preselected position, and said pressure signal is indicative of weight being supported by said ramp.

4. The apparatus of claim 3, further comprising a level sensor for generating a level signal representative of baler forward-rearward pitch relative to level ground wherein said level signal and said position signal provide an input to said control valve, the control valve configured to determine a position for interrupting movement of the ramp and taking the pressure signal as a function of both the level signal and the position signal thereby enabling said pressure signal indicative of weight supported by said ramp to compensate for variations in ground slope.

5. An apparatus for ejecting a completed bale from an agricultural round baler, the baler having a ground supported chassis for movement across the ground in a forward direction, a pickup for gathering crop material as the baler moves across the ground, a bale-forming chamber, and a movable tailgate for allowing a completed bale to be ejected rearwardly onto the ground, the apparatus comprising:
   a tailgate actuator for moving the tailgate between an open position and a closed position;
   a movable bale ramp pivotally connected to the chassis for pivotal movement about a fixed axis, said ramp having a forward portion and a rearward portion, said forward portion being angled with respect to said rearward portion;
   a ramp actuator for managing the pivotal position of said ramp between raised and lowered positions; and
   a hydraulic control system interconnecting said tailgate actuator and said ramp actuator wherein movement of the tailgate actuator toward the tailgate open position causes said ramp actuator to move said ramp to toward said lowered position, and movement of said tailgate actuator toward the tailgate closed position causes movement of said ramp actuator to move said ramp toward said raised position, wherein said tailgate actuator is a double-acting hydraulic actuator having an extension side and a retraction side and said ramp actuator is a single acting hydraulic actuator, said retraction side and said ramp actuator are hydraulically connected in a parallel arrangement to said hydraulic control system.

6. The apparatus of claim 5, wherein movement of said tailgate actuator and said ramp actuator is managed by a single hydraulic circuit.

7. The apparatus of claim 6, further comprising a control valve disposed in the hydraulic connection between said ramp actuator and said hydraulic control system, a pressure sensor for providing a pressure signal representing hydraulic pressure in said ramp actuator, and a position sensor for providing a position signal representing the pivotal position of said ramp, wherein said control valve manages movement of said second actuator to interrupt movement of said ramp at a preselected position, and said pressure signal is indicative of weight being supported by said ramp.

8. The apparatus of claim 7, further comprising a level sensor for generating a level signal representative of baler forward-rearward pitch relative to level ground wherein said level signal and said position signal provide an input to said control valve, the control valve configured to determine a position for interrupting movement of the ramp and taking the pressure signal as a function of both the level signal and the position signal thereby enabling said pressure signal indicative of weight supported by said ramp to compensate for variations in ground slope.

9. In an agricultural round baler having a forward end, an opposing rear end, a bale-forming chamber, a tailgate movable between generally opposing open and closed positions, a moveable bale kicker apparatus for urging a completed bale rearwardly away from the bale-forming chamber and tailgate, and a hydraulic control system for selectively managing movement of the tailgate and the bale kicker apparatus, the improvement in the bale kicker apparatus comprising:
   a tailgate actuator for moving the tailgate between an open position and a closed position;
   a movable bale ramp pivotally connected to the chassis for pivotal movement about a fixed axis, said ramp having a forward portion and a rearward portion, said forward portion being angled with respect to said rearward portion and having a line of intersection generally parallel to said fixed axis;
   a ramp actuator for managing the pivotal position of said ramp between raised and lowered positions; and
   a hydraulic control system hydraulically interconnecting said tailgate actuator and said ramp actuator wherein movement of the tailgate actuator toward the tailgate open position causes said ramp actuator to move said ramp to toward said lowered position, and movement of said tailgate actuator toward the tailgate closed position causes movement of said ramp actuator to move said ramp toward said raised position; and wherein said tailgate actuator is a double-acting hydraulic actuator having an extension side for receiving pressurized fluid from said hydraulic control system for moving the tailgate toward the open position, and a retraction side for receiving pressurized fluid from said hydraulic control system for moving the tailgate toward the closed position, and said ramp actuator is a single acting hydraulic actuator receiving pressurized hydraulic fluid for moving said ramp toward said raised position, said retraction side and said ramp actuator are hydraulically connected in a parallel arrangement to said hydraulic control system.

10. The improvement of claim 9, wherein movement of said tailgate actuator and said ramp actuator is managed by a single, reversible hydraulic circuit.

11. The improvement of claim 10, further comprising a control valve disposed in the hydraulic connection between said ramp actuator and said hydraulic control system, a pressure sensor for providing a pressure signal representing hydraulic pressure in said ramp actuator, and a position sensor for providing a position signal representing the pivotal position of said ramp, wherein said control valve manages movement of said second actuator to interrupt movement of said ramp at a preselected position, and said pressure signal is indicative of weight being supported by said ramp.

12. The improvement of claim 11, further comprising a level sensor for generating a level signal representative of baler forward-rearward pitch relative to level ground wherein said level signal and said position signal provide an input to said control valve, the control valve configured to determine a position for interrupting movement of the ramp and taking the pressure signal as a function of both the level signal and the position signal thereby enabling said pressure signal indicative of weight supported by said ramp to compensate for variations in ground slope.

13. The improvement of claim 9, wherein the hydraulic control system is configured to vent the ramp actuator when a fluid is received by the extension side of the tailgate such that a force applied to the ramp in a lowering direction, directs pressurized fluid from the ramp actuator out of the hydraulic control system and lowers the ramp.

14. The apparatus of claim 1, wherein the hydraulic control system has first and second connections configured for both providing a pressurized fluid and a non-pressurized return path from the hydraulic control system, the hydraulic control system interconnecting the first connection, the retraction port of the tailgate actuator and the ramp actuator; and the hydraulic control system further interconnects the second connection and the extension port of the tailgate actuator.

* * * * *